(12) United States Patent
Roe

(10) Patent No.: US 11,680,681 B2
(45) Date of Patent: Jun. 20, 2023

(54) METHODS AND APPARATUS FOR PROVIDING SAFETY DEFAULT STATES IN MECHANICAL EQUIPMENT, PROCESSES AND MECHANISMS

(71) Applicant: Philippe Roe, East Patchogue, NY (US)

(72) Inventor: Philippe Roe, East Patchogue, NY (US)

(*) Notice: Subject to any disclaimer, the term of this patent is extended or adjusted under 35 U.S.C. 154(b) by 482 days.

(21) Appl. No.: 16/792,161

(22) Filed: Feb. 14, 2020

(65) Prior Publication Data
US 2020/0263827 A1    Aug. 20, 2020

Related U.S. Application Data

(60) Provisional application No. 62/910,559, filed on Oct. 4, 2019, provisional application No. 62/806,893, filed on Feb. 17, 2019, provisional application No. 62/805,940, filed on Feb. 14, 2019.

(51) Int. Cl.
*F16P 3/00* (2006.01)
(52) U.S. Cl.
CPC ...................... *F16P 3/00* (2013.01)
(58) Field of Classification Search
CPC ...... F16P 3/00; F16P 3/005; F16P 3/08; F16P 3/10; F16P 3/12
See application file for complete search history.

(56) References Cited

U.S. PATENT DOCUMENTS

| | | |
|---|---|---|
| 6,387,332 B1 | 5/2002 | Dickinson |
| 2008/0292515 A1 | 11/2008 | Ongaro et al. |
| 2009/0123339 A1 | 5/2009 | Sampson |
| 2009/0185920 A1 | 7/2009 | Lanigan et al. |
| 2009/0208365 A1 | 8/2009 | McSherry et al. |
| 2010/0266445 A1 | 10/2010 | Campagna |
| 2017/0304476 A1 | 10/2017 | Taggart et al. |
| 2017/0360974 A1 | 12/2017 | Fregoso |
| 2019/0001007 A1 | 1/2019 | Lyslo et al. |

*Primary Examiner* — Carlos Amaya
(74) *Attorney, Agent, or Firm* — Daniel P. Burke & Associates, PLLC; Daniel P. Burke

(57) ABSTRACT

Methods and apparatus provide safety systems for operating equipment having confined spaces which, during normal use, have conditions, such as extreme temperatures, pressures and/or caustic/toxic chemicals or other harmful gases which can be fatal to an otherwise healthy adult human. To protect humans inadvertently trapped in the confined space after the start of a normal operation cycle, the safety systems not only stop the equipment which is creating the harmful condition, such as a cutting off a supply of high pressure steam, but also remove the harmful condition or render it survivable. Versions also open access doors permitting escape and/or rescue of persons trapped in the confined space.

22 Claims, 5 Drawing Sheets figure 1 NORMAL OPERATING STATE - DEFAULT SAFETY STAND BY

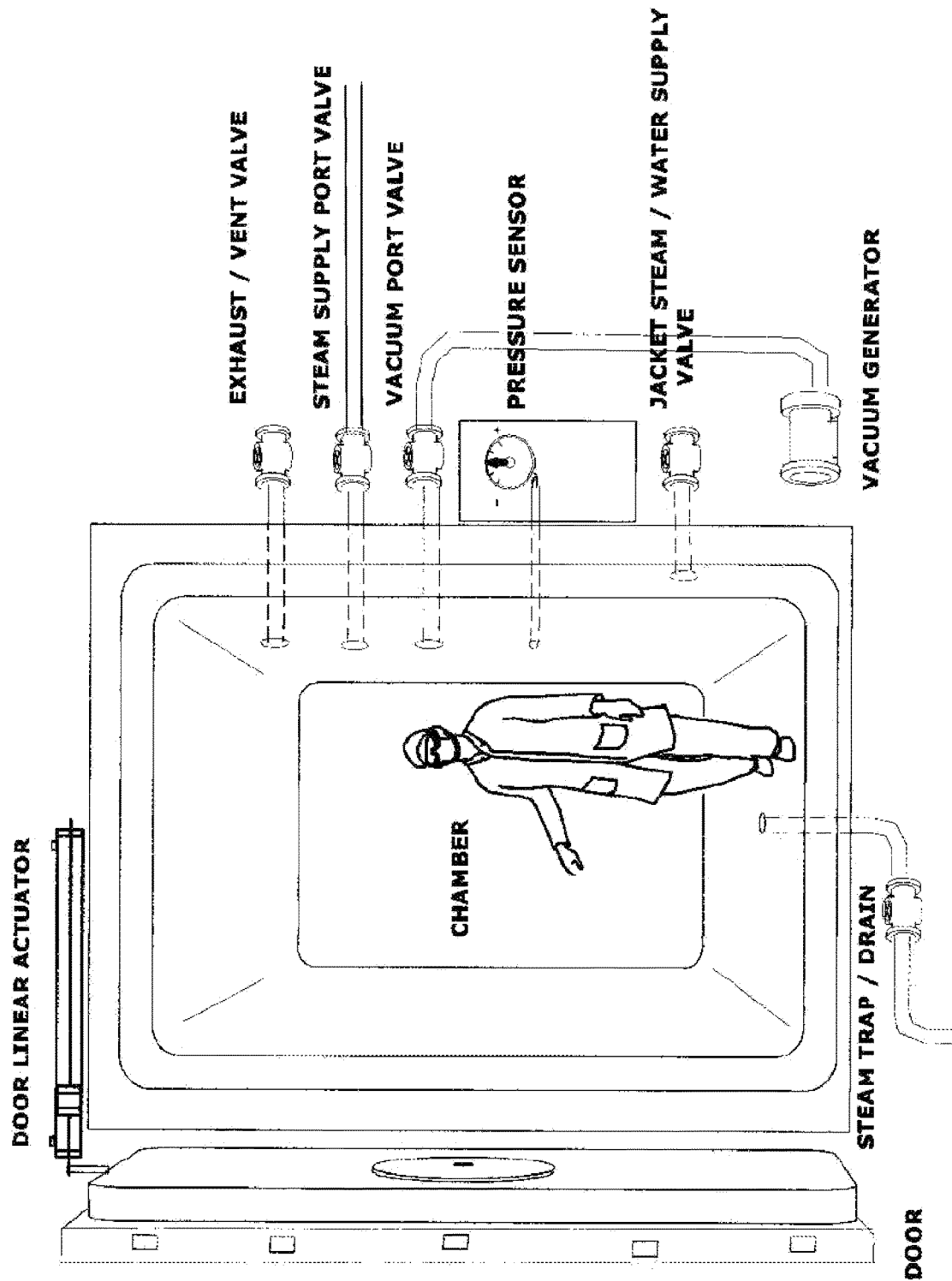

METHODS AND APPARATUS FOR PROVIDING SAFETY DEFAULT STATES IN MECHANICAL EQUIPMENT, PROCESSES AND MECHANISMS

RELATED APPLICATION DATA

This application claims the benefit of U.S. Provisional Patent Application Ser. No. 62/805,940, filed Feb. 14, 2019, U.S. Provisional Patent Application Ser. No. 62/806,893, filed Feb. 17, 2019, and U.S. Provisional Patent Application Ser. No. 62/910,559, filed Oct. 4, 2019, which are hereby incorporated by reference.

Methods and apparatus provide safety systems for operating equipment having confined or restricted hazardous spaces which, during normal use, have conditions, such as extreme temperatures, pressures and/or caustic/toxic chemicals or other harmful gases which can be fatal to an otherwise healthy adult human. To protect humans inadvertently trapped in the confined space after the start of a normal operation cycle, the safety systems not only stop the equipment which is creating the harmful condition, such as a cutting off a supply of high pressure steam, but also remove the harmful condition or render it survivable. Versions also open access doors permitting escape and/or rescue of persons trapped in the confined space.

BACKGROUND

Various types of certain operating equipment, such as autoclaves, chemical sterilizers, and wash equipment, have confined spaces which are large enough for ingress and egress by an adult human. During a normal operating cycle, such equipment will create a condition within creating a confined or restricted space which is not survivable by a normal, healthy adult human. Such conditions can include one or more of extreme temperatures, high pressure steam, caustic and/or toxic gases, such as ethylene oxide.

There have been accidents wherein a person has become trapped with the confined space of the operating equipment, the normal cycle of operation has been commenced and the trapped person has perished. While developing safety equipment for such operating equipment, it has been learned that when an emergency safety Stop mechanism or system is engaged or an interruption in control power and/or other energizing utilities is experienced, in various types of equipment; such as: small and bulk autoclaves and chemical sterilizers, rack and cage wash equipment, and similar types of equipment; dangerous conditions and/or lethal conditions, such as a pressurized vessel, thermal and/or caustic exposure, entrapment or an unmanaged vessel containing chemical sterilants can result. Specifically, the current state of such equipment is to provide safety STOP switches, but that actuation of existing emergency STOP switches will stop the equipment in its current state but will not return the confined space to a survivable condition and will not open the access door(s) to allow escape or rescue by the trapped person. In other words, even after an emergency STOP switch is activated, with current equipment, a person trapped in a confined space is maintained in the confined space with the unhealthy condition initiated or created by the normal operation of the equipment. Therefore, there is a need for improvements in such operating equipment to reduce the risk of serious injury and death to persons who become inadvertently trapped.

SUMMARY

The present methods and apparatus provide default safe conditions for otherwise dangerous equipment such as autoclaves and sterilizer equipment, during an emergency system engagement or a power interruption, wherein the process cycle is terminated and the equipment is returned to a mechanical Safety Default State, in which the chamber is evacuated of chemical agents, if any, returned to substantially ambient atmospheric pressure and the doors are unsealed. A chamber door is preferably automatically opened, unless the doors are designed for manual operation only, or door operation is otherwise addressed in protocols, such as for biohazard containment.

BRIEF DESCRIPTION OF THE DRAWINGS

FIG. 5 illustrates the utilities connected to a standard sterilization chamber.

DETAILED DESCRIPTION

Figure 1:
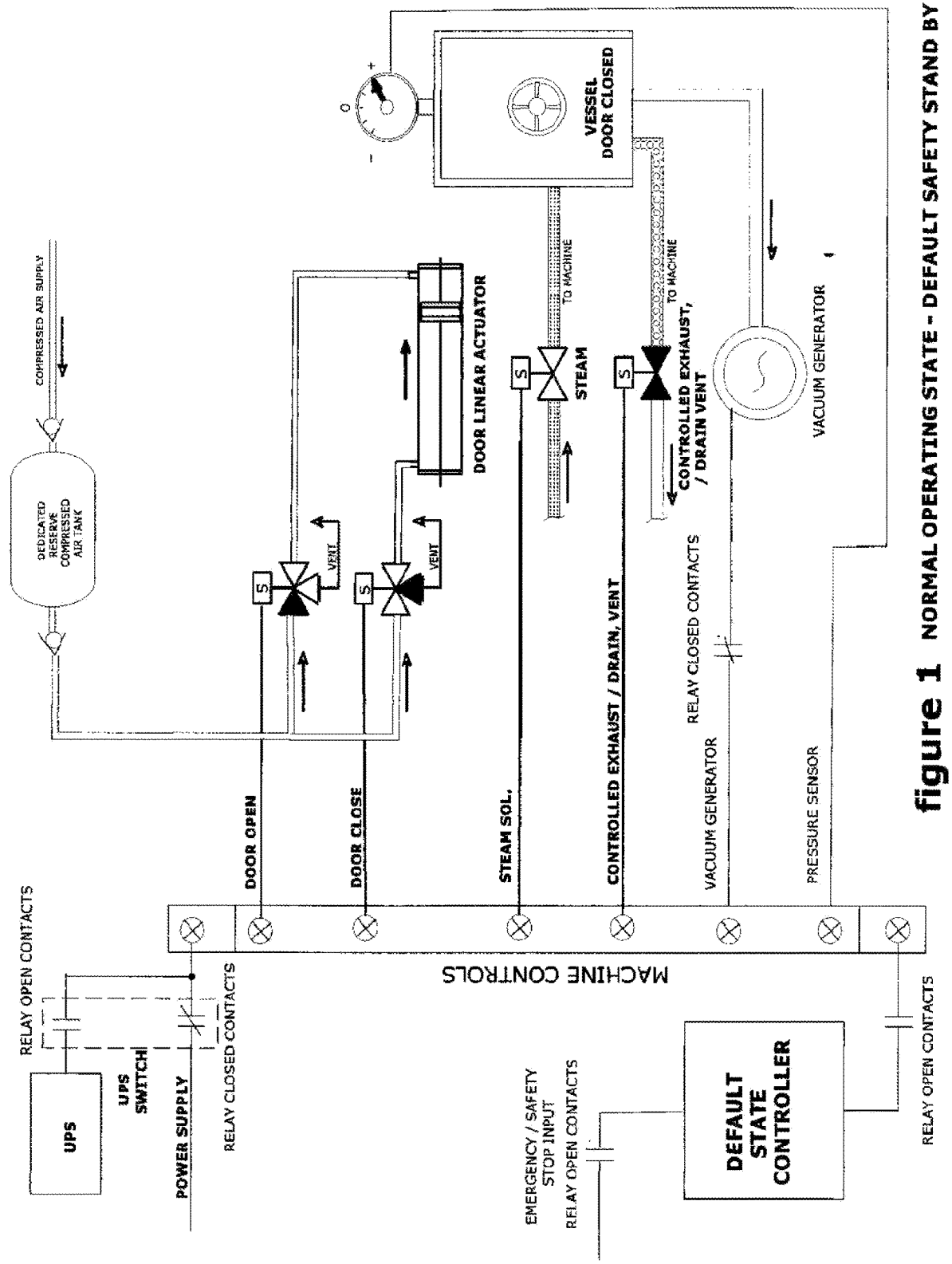
FIG. 1 illustrates Normal Operation of Equipment.

As noted above, the present methods and apparatus provide default safety state conditions for otherwise dangerous equipment having confined spaces or restricted spaces which are large enough for adult human ingress and egress, such as autoclaves and sterilizer equipment, during an emergency system engagement or a power interruption, wherein the process cycle is terminated and the equipment is returned to a mechanical Safety Default State, in which the chamber is evacuated of chemical agents, if any, returned to substantially ambient atmospheric pressure and the doors are unsealed. A chamber door is preferably automatically opened, unless the doors are designed for manual operation only, or door operation is otherwise addressed in protocols, such as for biohazard containment.

In wash equipment, where scalding water or chemicals are used, in addition to terminating the process cycle, the present methods and apparatus require a manual re-start (non-automatic start). When an emergency safety Stop mechanism or system is engaged, a cold water shower/rinse is provided inside the chamber, and the doors are automatically opened.

All interruptions, emergency system engagement, e.g. stop button, overpressure condition, etc., or a power interruption are preferably accompanied by notifications, such as an audible alarm, visual signals and/or other communications.

Preferred Safety Default States for Mechanical Equipment include:

Terminating the processing cycle;
Providing notifications, such as audible alarm, visual signals and/or other communications;
Returning the chamber to ambient atmospheric pressure;
And opening the chamber door
If the mechanical equipment is washed equipment, e.g. comprising high temperature and/or high pressure, in addition to automatically opening the door or doors, a cold water shower rinse is provided.

By example, for autoclave equipment, the following steps are provided if a Safety System is engaged and/or if the equipment's source of power is interrupted:

An Audible Alarm is sounded and a visual HMI Screen Flashes the Emergency Alert Icon;
The equipment's cycle is terminated;
The input steam valve is closed;
The Vacuum Pump is stopped;
The chamber is depressurized by:
Opening the Drain valve or exhaust valve if the chamber pressure was a predetermined value above atmospheric pressure;
Opening the Vent valves if the chamber pressure was a vacuum having at least a predetermined negative pressure value; and/or
Opening both the drain valves and vent valves when the pressure is at atmospheric pressure (or within a predetermined pressure range of atmospheric pressure)
When the chamber pressure reaches atmospheric (or some other predetermined range close to atmospheric pressure), then the side door seals are unsealed (depressurized) for all door types; then the Load Side Door is opened, for equipment with automated door operating mechanisms.

For wash equipment, the following steps are provided if a Safety System has been engaged:

An Audible Alarm is sounded, and a visual HMI Screen Flashes the Emergency Alert Icon;
The equipment's cycle is terminated;
The input Steam valve is closed;
The Wash Pump is stopped;
A cold water shower/rinse is provided through nozzles inside the chamber; and
Doors are automatically opened, for example, using linear actuators, such as pre-pressurized pneumatic cylinders.

To assure that all emergency functions can be executed in the event of a power interruption, the disclosed methods and apparatus provide back-up utilities, such as UPSs, with sufficient power reserves to carry out all desired functions. To carry out desired functions and power desired components, the desired functions are provided by components, such as, essential equipment controllers, relays, solenoid valves and other valve actuators. Desired functions include controlling all controlled equipment and the subject equipment as desired, as well as providing required communication between the various components. In cases where hydraulics are used for desired emergency operation, all UPSs have the capacity to operate included hydraulic pumps and valves. Additionally, a compressed air tank with sufficient capacity to operate all pneumatic components is provided so that the pneumatic components can complete the emergency tasks.

Examples of Safety Default States

The following figures provide examples of valve and door states during normal operation, upon activation of a default state controller, and two final default states.

Explanation of Equipment and Default States

FIG. 1 Normal Operation of Equipment

The vessel doors are closed, the vessel is pressurized; the pneumatic solenoids, steam, controlled exhaust and drain valves, and the vacuum pump operate as normal.

Diagram description of FIG. 1

The chamber (vessel) doors are in the closed position. In this example, the "door close" pneumatic control valve is positioned to maintain the "door actuator" (linear actuator) in the closed position state.

With the door(s) closed, the equipment can operate normal cycles: with steam, vacuum, chemical solenoids and valves activated as needed during cycle.

The door(s) cannot be opened while the equipment is in cycle, typically with pressure, vacuum, chemical or other process. The Default State Controller and the UPS (if present), are in standby mode.

Figure 2:
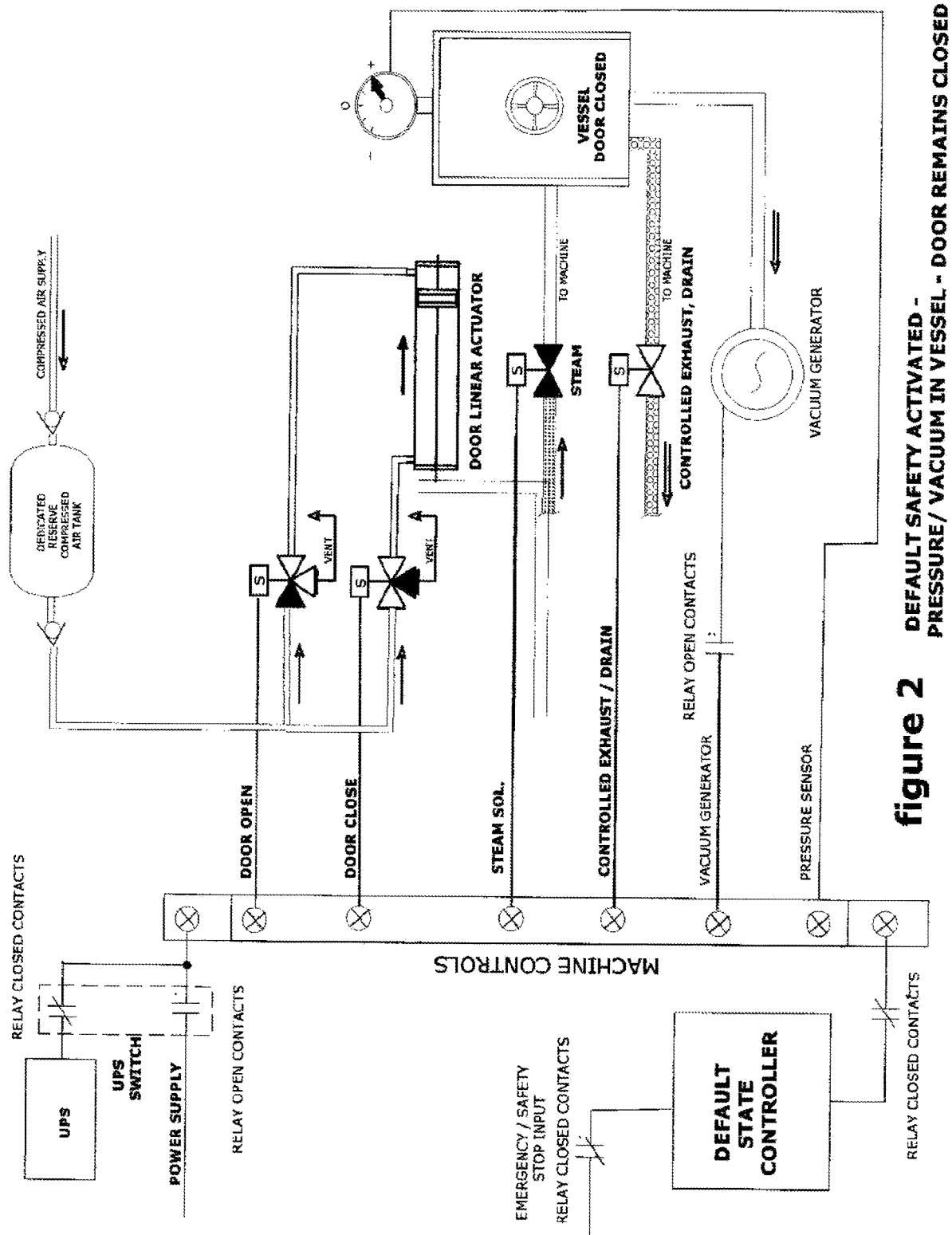
FIG. 2 illustrates a result of Power Interruption or Safety System Engagement—Step 1 ACTIVATION OF DEFAULT STATE CONTROLLER

FIG. 2 Power Interruption or Safety System Engagement—Step 1 ACTIVATION OF DEFAULT STATE CONTROLLER If power is interrupted to the equipment or if the safety system has been engaged (such as if the emergency stop button depressed), then, in addition to or because of the UPS being engaged, the Default State Controller is activated.

The doors initially remain closed while the vessel is de-pressurized and/or any hazardous chemical sterilant has been vented, e.g. into an ethylene oxide neutralization scrubber. Thus the Pneumatic solenoids for door control maintain their states, the intake steam valve is closed, controlled exhaust and drain valves are opened and the vacuum pump is stopped, per protocol, e.g. operated under the control of the Default State Controller as/if required.

Diagram description of FIG. 2

Activation of the Default State Controller via an Emergency/Safety Stop input from an external switch or equipment control generated signal. The UPS is activated by loss of power and would activate the Default State Controller.

The chamber (vessel) doors remain in the closed position while pressure, vacuum or chemical present. Steam valve is closed, the vacuum generator is disabled and the Controlled Exhaust/Drain and Vent (not shown) valves are activated as need to bring the vessel to atmospheric pressure.

Figure 3:
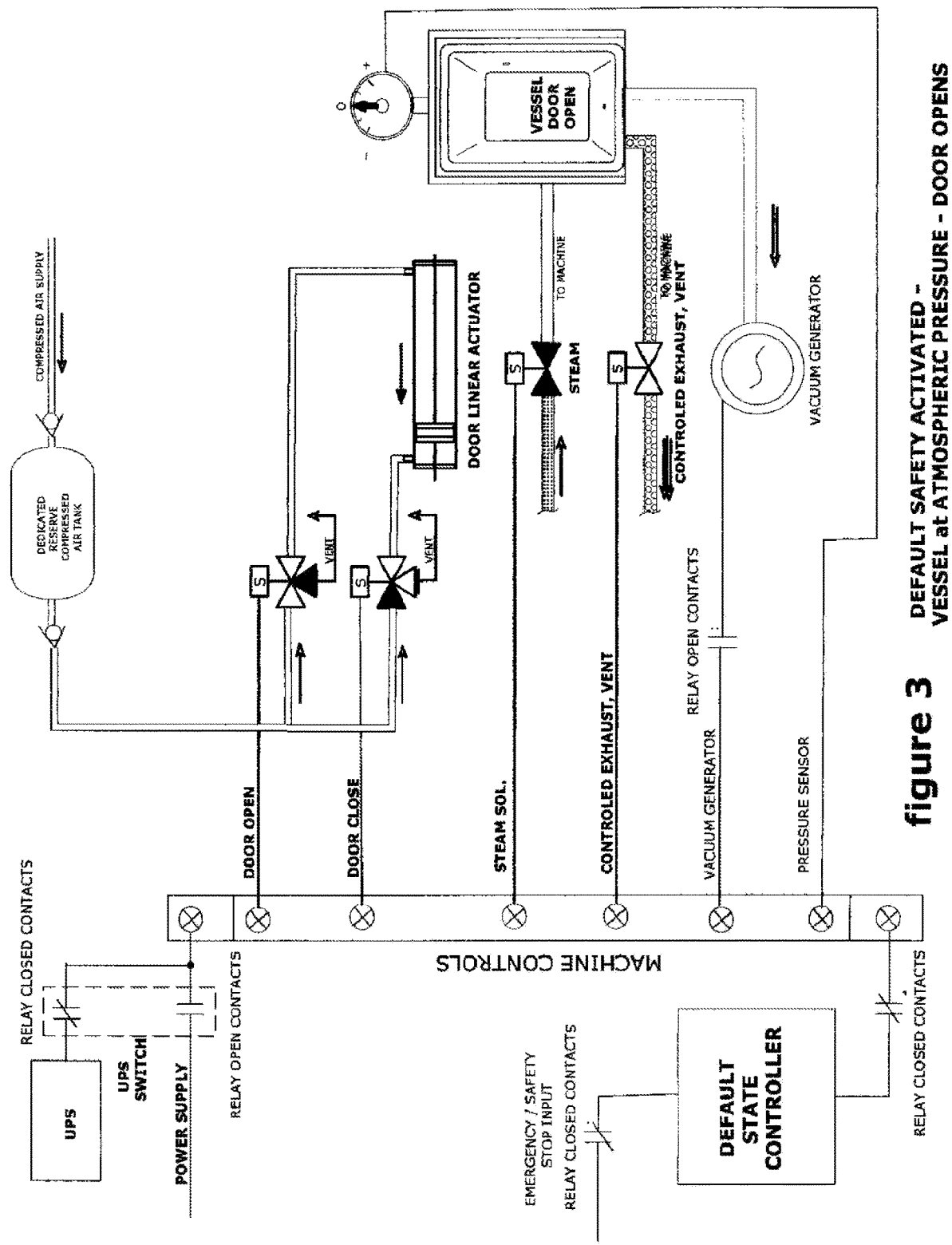
FIG. 3 illustrates a result of Power Interruption or Safety System Engagement—Step 2 DEFAULT STATE for a high pressure steam sterilizer

FIG. 3 Power Interruption or Safety System Engagement—Step 2 DEFAULT STATE for a high pressure, steam sterilizer When the vessel interior is at atmospheric pressure or within some predetermined range of atmospheric pressure, then the door control solenoid states are changed so that the doors are unsealed. The doors are opened automatically, unless the doors are designed for manual operation only, or door operation is otherwise addressed in protocols.

All other mechanical outputs; such as valves and solenoid states are maintained in stasis relative to FIG. 2.

Diagram description of FIG. 3

When vessel reach atmospheric pressure, the chamber (vessel) doors open. In this example, the "door open" pneumatic control valve is positioned to maintain the "door actuator" (linear actuator) in the open position state.

Figure 4:
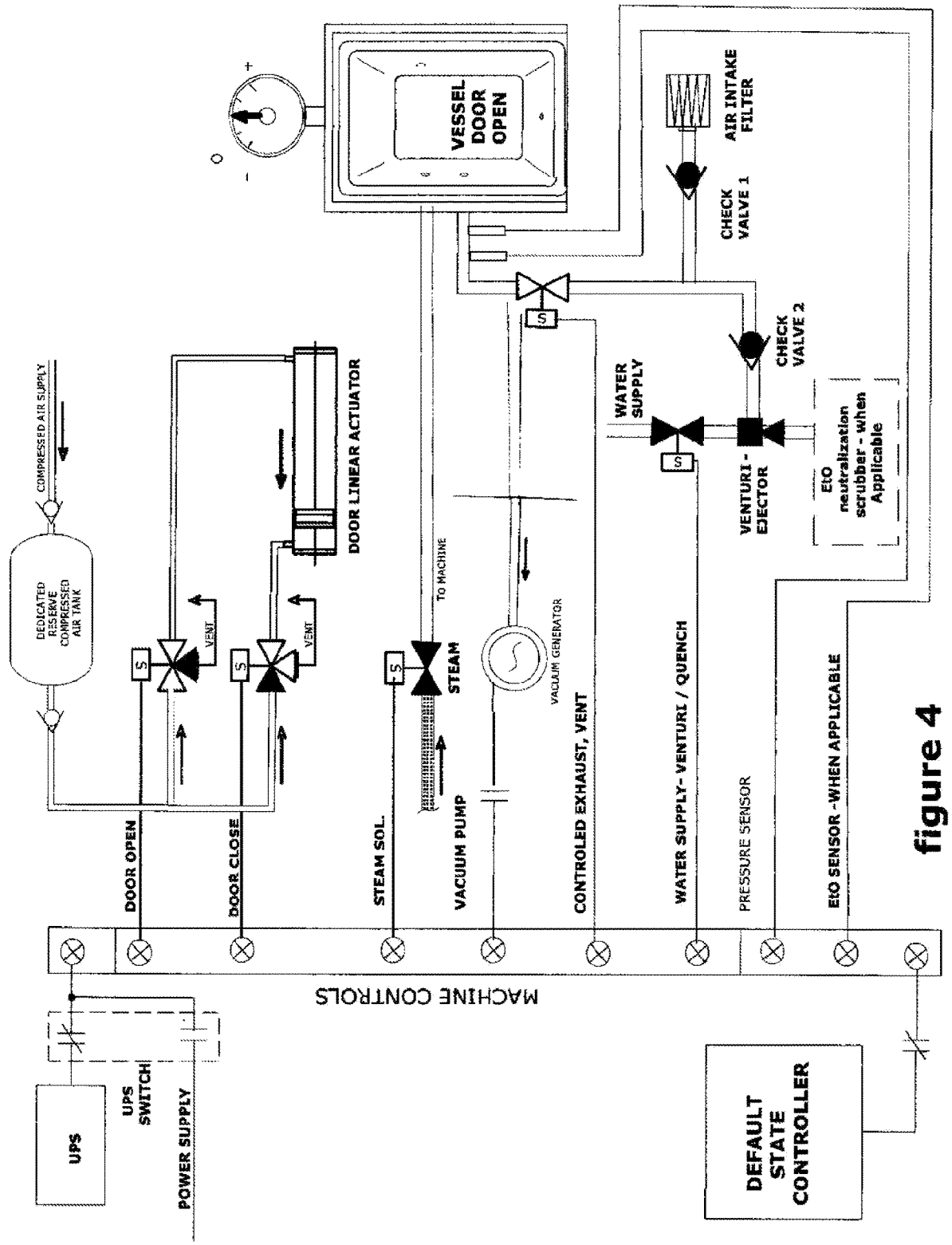
FIG. 4 illustrates the result of a Power Interruption or Safety System Engagement—Step 2 DEFAULT STATE for an ethylene oxide sterilizer

FIG. 4 Power Interruption or Safety System Engagement—Step 2 DEFAULT STATE for an ethylene oxide or other hazardous chemical sterilizer When vessel interior is cleared of the hazardous chemical or reduced to some predetermined level as indicated by a sensor positioned in the chamber or in the vented flow, then the door control solenoid states are changed so that the doors are unsealed. The doors are opened automatically, unless the doors are designed for manual operation only, or door operation is otherwise addressed in protocols.

All other mechanical outputs; such as valves and solenoid states are maintained in stasis.

NOTE: the normal state of the Default State Controller, when power is absent or has been interrupted, is such that the Equipment or the Equipment's components, cannot be energized unless the Default State Controller is willfully reset.

FIG. 5 Typical components and utilities that act upon the chambers (vessels) state, such as the pressure or vacuum.

The following table provides examples of the times needed to restore certain types of systems to conditions which are safe to human occupants. These times, referred to as "reaction time" in the table, were based on a chamber having a volume of 5.66 m³.

| Chamber/Vessel Type | Conditions | Reaction Time * | SAFETY DEFAULT STATE |
|---|---|---|---|
| Steam Sterilizer | From atmospheric to fully pressurized or at full vacuum | 0-19.25 sec | Chamber comes to atmospheric pressure and door(s) open<br>If at max Pressure, 15 psig, then valve opens and water for venturi device opens (or vacuum pump) to assist in removal of steam from chamber. Steam flow is restricted to keep velocity below supersonic speed of 331 meters/sec. Steam is quenched with water to prevent steam release into atmosphere.<br>If at max Vacuum, 27-29" Hg, open vent valve, stop vacuum generators (venturi ejectors, vacuum pumps). |
| Chemical Sterilizers Ethylene Oxide, Chlorine Dioxide | vacuum/chemical | Minimum time to reduce EtO to safe levels | Chamber cleared of EtO and Door(s) are "Openable"<br><br>If in pre-conditioning cycle, with or without vacuum, the doors become "Openable"<br>If EtO has been introduced into the load, then the chamber is ventilated into the EtO neutralization scrubber. When EtO is not detected in the vented flow, then the door(s) become "Openable". |
| Chemical Sterilizers (H2O2) | Chemical, other | immediate | Turn off chemical sources, open door(s) and ventilate. Use actuators to force doors to open. |
| Dry Heat Sterilizers | non-pressurized High Temp | immediate | Turn off heat sources, open door(s) cool ventilate. Use actuators to force doors to open. |
| Ovens, Industrial | non-pressurized High Temperature | immediate | Turn off heat sources, open door(s). Use actuators to force doors to open. |
| Rack/Cart Wash Equipment | Hot/scalding Water | immediate + 15 min dousing shower | Turn off wash pumps, open door(s). Use actuators to force doors to open. Add cooling Dousing showers to curtail scorching. |
| Cold Rooms, Vaults, etc. | Life Threatening environments or entrapment | immediate | Use actuators to force doors to open. |

* Based on 5.66 m³ chamber volume

The invention claimed is:

1. An operating equipment comprising:
    a structure defining a confined space to contain a human adult and comprising at least one access port which is for human ingress and egress;
    a supply of at least one condition to the confined space of said structure for performing a normal operation, wherein said at least one condition would present an imminent danger to the survivability of a human adult present within said confined space during said normal operation;
    equipment for returning the confined space to substantially ambient conditions after a normal operation has been performed;
    a supply controller which controls the intensity of at least one condition created in said confined space to change the intensity of said condition in said confined space from a first condition which is tolerable for an adult human to a second condition which presents an imminent danger to the survivability of a human adult;
    a safety system for said confined space, said safety system comprising:
    a safety default state controller which comprises at least a standby state and an activated state, said safety default state controller operatively connected to said supply controller;
    an activation switch for changing the state of said safety default state controller from said standby state to said activated state;
    said safety default state controller controls said supply controller and said equipment to terminate the creation of said condition and to return said confined space to substantially ambient conditions.

2. The operating equipment according to claim 1 wherein said activation switch is activated in response to mechanical input within said confined space.

3. The operating equipment according to claim 2 wherein said activation switch is also activated in response to an interruption of electrical power to said operating equipment.

4. The operating equipment according to claim 1 wherein said condition comprises at least one of an extreme temperature, a vacuum, high pressure steam or a hazardous/toxic chemical.

5. The operating equipment according to claim 4 wherein said equipment vents a toxic chemical from said confined space to a chemical scrubber.

6. The operating equipment according to claim 4 wherein said equipment vents a dangerous gas from said confined space.

7. The operating equipment according to claim 4 wherein said equipment automatically opens at least one access door to said confined space.

8. The operating equipment according to claim 4 wherein said equipment provides a water rinse to the interior of said confined space to flush with cool water, a human who had been trapped in said confined space, to stop scalding and/or rinse away hazardous or toxic chemicals off said human.

9. The operating equipment according to claim 4 wherein said equipment comprises a drain for venting high pressure steam from said confined space.

10. The operating equipment according to claim 1 wherein said activation switch comprises a plurality of optical light switches.

11. The operating equipment according to claim 1 wherein said operating equipment is one of an autoclave, a chemical sterilizer, and washing equipment.

12. A method for providing safety default states to operating equipment, said operating equipment comprising:
    a structure defining a confined space to contain a human adult and comprising at least one access port which is for human ingress and egress;
    a supply of at least one condition to the confined space for performing a normal operation, wherein said at least one condition presents an imminent danger to the survivability of a human adult present within said confined space during said normal operation;
    equipment for returning the confined space to substantially ambient conditions after a normal operation has been performed; and
    a supply controller which controls the intensity of at least one condition created in said confined space to change the intensity of said condition in said confined space from a first condition which is tolerable for an adult human to a second condition which presents an imminent danger to the survivability of an adult human; said method comprising the steps of:
    providing a safety default state control comprising a standby state and an activated state, said safety default state control changing from said standby state to said activated state in response to at least one predetermined input;
    said safety default state control operatively connected to said supply controller;
    said safety default state control, when in the activated state, controlling said supply controller to terminate the creation of said condition and controlling said equipment to return said confined space to substantially ambient conditions.

13. The method for providing safety default states to operating equipment according to claim 12 wherein said step of providing a safety default state control which is responsive to at least one input comprises providing a safety default state control which is responsive to a mechanical input within said confined space.

14. The method for providing safety default states to operating equipment according to claim 12 wherein said step of providing a safety default state control which is responsive to at least one input comprises providing a safety default state control which is responsive to an interruption of electrical power to said operating equipment.

15. The method for providing safety default states to operating equipment according to claim 12 wherein said step of controlling said equipment comprises substantially removing a dangerous condition from said confined space, said dangerous condition comprising at least one of an extreme temperature, a vacuum, high pressure steam and/or a toxic or hazardous chemical.

16. The method for providing safety default states to operating equipment according to claim 12 wherein said step of controlling said equipment comprises controlling said equipment to cause the transfer of at least one toxic gas from said confined space to a chemical scrubber.

17. The method for providing safety default states to operating equipment according to claim 12 wherein said step of controlling said equipment comprises controlling said equipment to vent a dangerous gas from said confined space.

18. The method for providing safety default states to operating equipment according to claim 12 wherein said step of controlling said equipment comprises controlling said equipment to open at least one access door to said confined space.

19. The method for providing safety default states to operating equipment according to claim 12 wherein said step of controlling said equipment comprises controlling said equipment to provide a water rinse to the interior of said confined space to flush with cool water, a human who had been trapped in said confined space, to stop scalding and/or rinse away hazardous or toxic chemicals off said human.

20. The method for providing safety default states to operating equipment according to claim 12 wherein said equipment comprises a drain for venting high pressure steam from said confined space said step of controlling said equipment comprises controlling said equipment to vent high pressure steam from said confined space.

21. The method for providing safety default states to operating equipment according to claim 12 further comprising the step of providing a safety activation switch comprising a plurality of optical light switches within said confined space and wherein said step of providing a safety default control comprises providing a safety default control which is responsive to activation of said switch.

22. The method for providing safety default states to operating equipment according to claim 12 wherein said operating equipment is one of an autoclave, a chemical sterilizer, and washing equipment.

* * * * *